United States Patent
Shimoda et al.

(10) Patent No.: US 7,203,517 B2
(45) Date of Patent: Apr. 10, 2007

(54) MOBILE COMMUNICATION TERMINAL DEVICE

(75) Inventors: Shinichi Shimoda, Yokohama (JP); Naoki Mori, Yokohama (JP)

(73) Assignee: Hitachi, Ltd., Tokyo (JP)

(*) Notice: Subject to any disclaimer, the term of this patent is extended or adjusted under 35 U.S.C. 154(b) by 494 days.

(21) Appl. No.: 10/625,723

(22) Filed: Jul. 24, 2003

(65) Prior Publication Data

US 2004/0162109 A1    Aug. 19, 2004

(30) Foreign Application Priority Data

Aug. 1, 2002    (JP) .............................. 2002-224324

(51) Int. Cl.
*H04B 1/38* (2006.01)
*H04Q 7/20* (2006.01)

(52) U.S. Cl. .................. 455/557; 455/344; 455/456.1

(58) Field of Classification Search .................. 455/1, 455/12.1, 427, 450, 452.1, 452.2, 453, 456.1, 455/456.6, 414.1, 344, 345, 556.1, 557, 452
See application file for complete search history.

(56) References Cited

U.S. PATENT DOCUMENTS

| | | | |
|---|---|---|---|
| 5,913,170 A * | 6/1999 | Wortham .................. | 455/457 |
| 5,987,319 A * | 11/1999 | Hermansson et al. ........ | 455/450 |
| 6,122,514 A * | 9/2000 | Spaur et al. .................. | 455/448 |
| 6,175,731 B1 | 1/2001 | Ohsuge | |
| 6,185,413 B1 * | 2/2001 | Mueller et al. ........... | 455/414.1 |
| 2004/0110524 A1 | 6/2004 | Takano et al. | |

FOREIGN PATENT DOCUMENTS

| | | |
|---|---|---|
| JP | 07177570 | 7/1995 |
| JP | A-10-051835 | 2/1998 |
| JP | 10164660 | 6/1998 |
| JP | A-10-174169 | 6/1998 |
| JP | A-11-509069 | 8/1999 |
| JP | 2001309445 | 11/2001 |
| JP | 2002010313 | 1/2002 |
| JP | A-2002-152407 | 5/2002 |
| JP | A-2002-157181 | 5/2002 |
| JP | A-2002-190769 | 7/2002 |
| JP | A-2002-330197 | 11/2002 |

* cited by examiner

*Primary Examiner*—Quochien B. Vuong
(74) *Attorney, Agent, or Firm*—Mattingly, Stanger, Malur & Brundidge, P.C.

(57) ABSTRACT

A mobile communication terminal device which includes a plurality of different communication interfaces that are automatically switched for making a communication. The stable connection is ensured whether the terminal device remains at rest or is moving by monitoring positional information on the terminal device for a moving situation thereof to control a selection from a plurality of physical interfaces. This selection control involves selecting a connection to a narrow range communication such as wireless LAN which is inexpensive and stable when the terminal device remains at rest, and selecting a connection for a communication through a portable telephone which provides a connection over a wider range when the terminal device is moving. Also, a connection for a communication is automatically selected from the positional information, thereby permitting an automatic selection of a connection intended by the user.

10 Claims, 11 Drawing Sheets

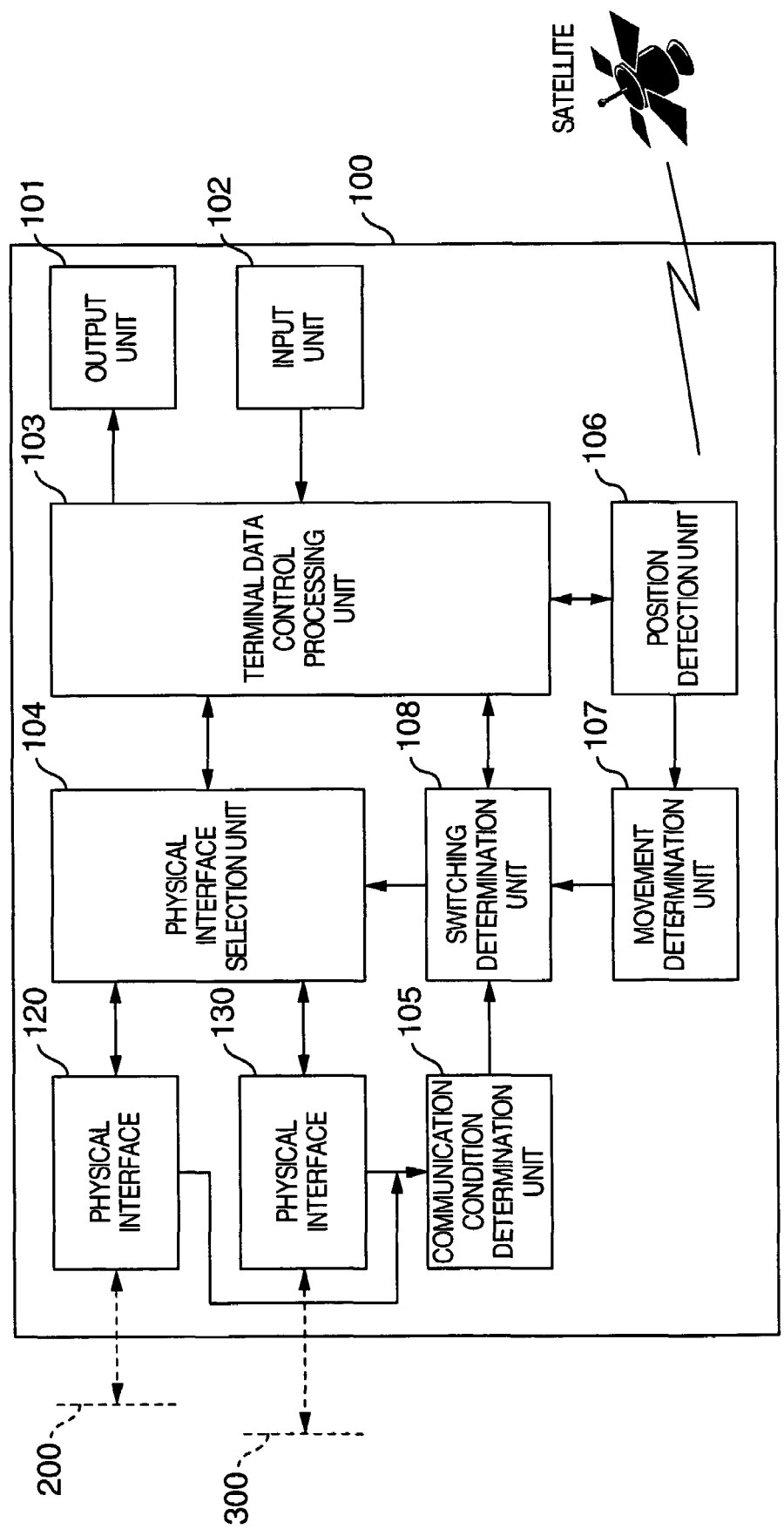

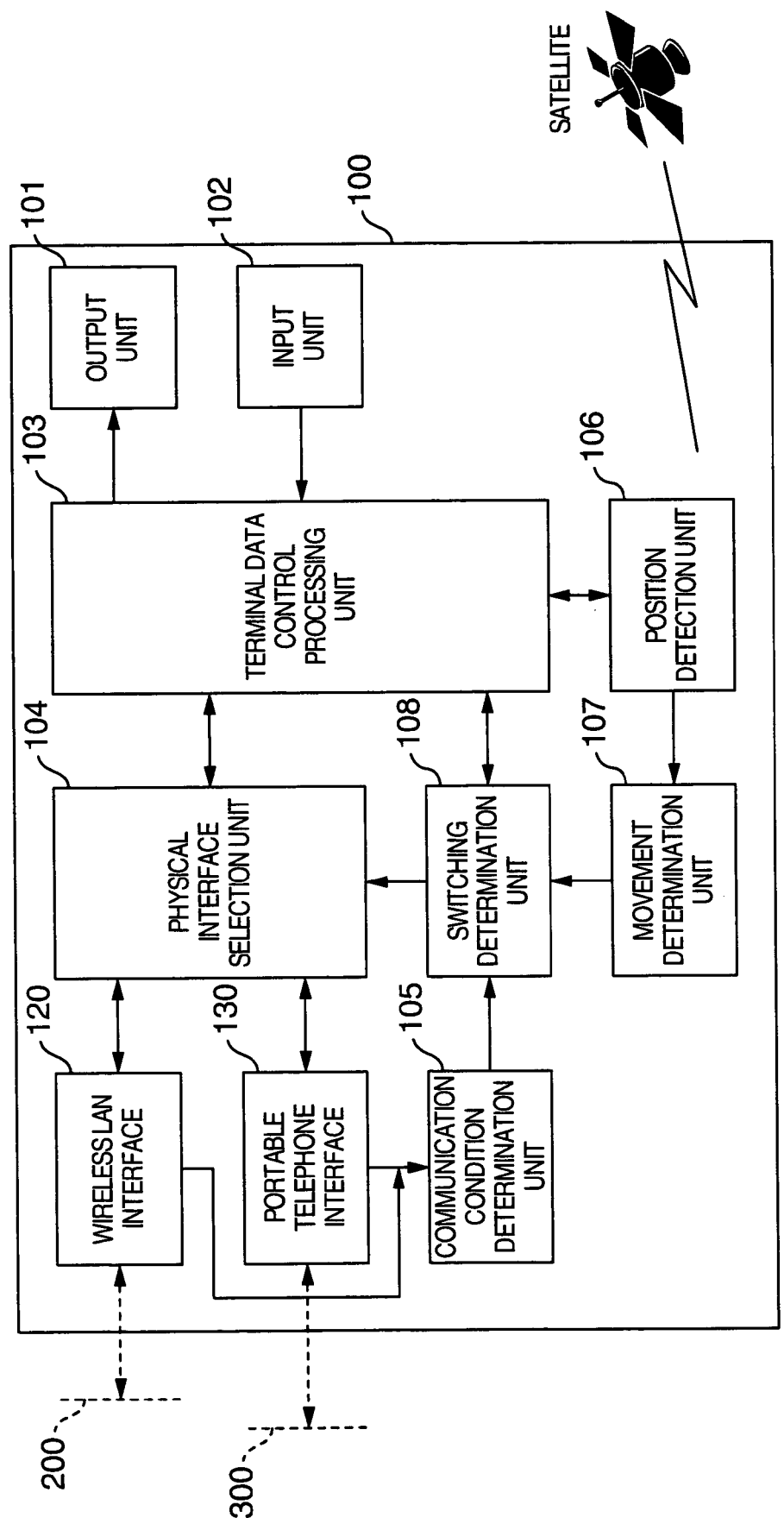

FIG.4
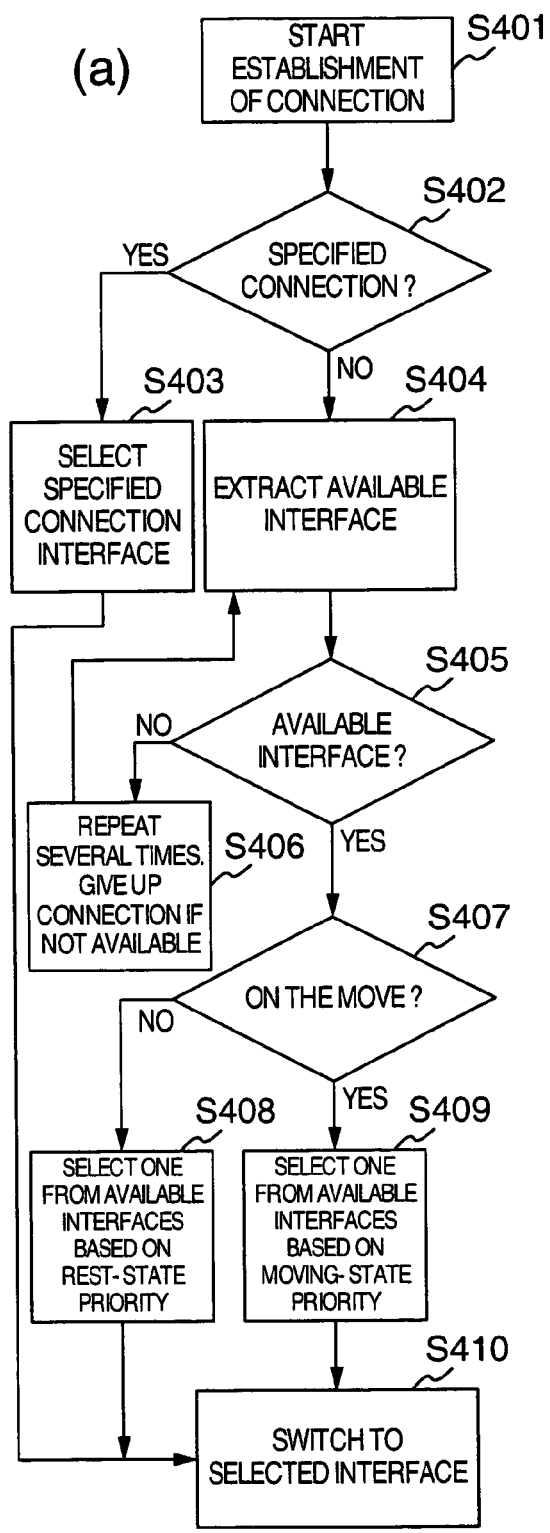
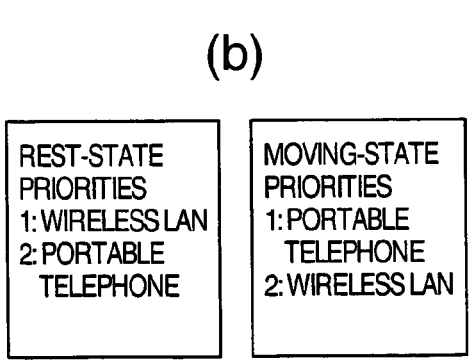

FIG.10

| MEMORY NUMBER | POSITION INFORMATION | MOVING SITUATION | SELECTED PHYSICAL IF |
|---|---|---|---|
| 1 | +35. 1234, +135. 5678 | HIGH SPEED MOVE | PORTABLE TELEPHONE |
| 2 | +34. 9876, +140. 5432 | STATIONARY | WIRELESS LAN |
| 3 | +35. 0000, +135. 0000 | HIGH SPEED MOVE | WIRELESS LAN |
| 4 | +35. 5555, +135. 5555 | LOW SPEED MOVE | PORTABLE TELEPHONE |
| --- | --- | --- | --- |

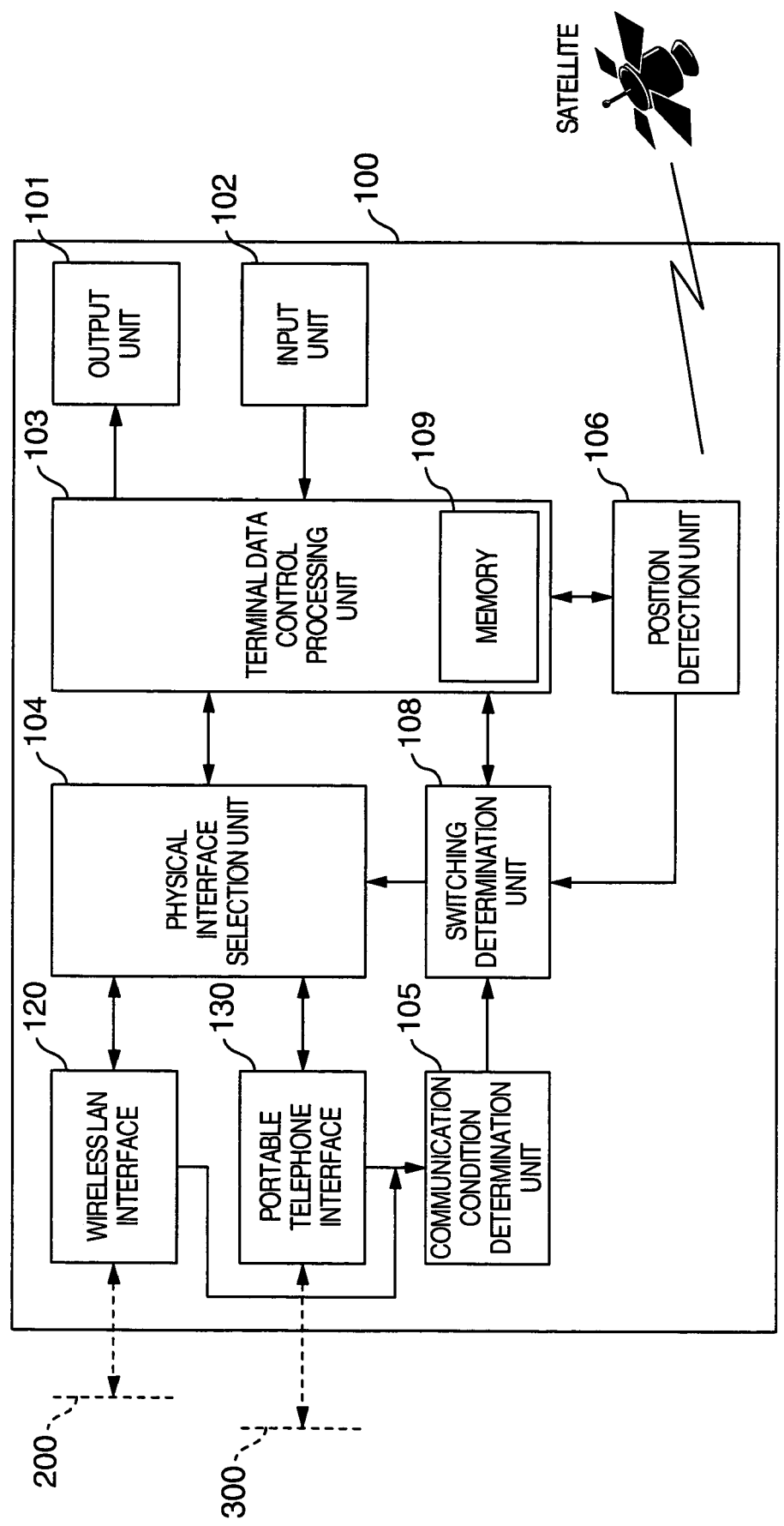

MOBILE COMMUNICATION TERMINAL DEVICE

BACKGROUND OF THE INVENTION

The present invention relates to a mobile communication terminal device, and more particularly to a communication control for a mobile communication terminal device which has a plurality of different communication interfaces.

Conventionally, in the mobile communication, a communication control for switching among physical interfaces of a mobile communication terminal device having a plurality of different communication interfaces is implemented by selecting an optimal communication interface depending on communication situations of the respective communication interfaces, and switching to the selected communication interface at a proper timing during a communication, as described, for example, in JP-A-2002-152407. In addition, JP-A-2002-157181 shows an automatic operation for switching from one physical interface to another based on the communication rate, line congestion information, communication charge and the like which can be acquired from a communication line.

SUMMARY OF THE INVENTION

In the conventional methods, when a mobile communication terminal having a plurality of different communication interfaces moves in environments in which the respective interfaces are available, it is expected that the interfaces change place in the rank for their availability and favorableness for communication from time to time in the movement, resulting in frequent switching among the physical interfaces for a communication. Thus, the conventional methods are disadvantageously lack for stability particularly when the mobile communication terminal moves at a high speed. Also, during a movement, the mobile communication terminal can go out of an area in which a communication is available, and is therefore obliged to switch the former interface to another one, resulting in the switching of interfaces a larger number of times than when the terminal utilizes from the outset an interface which is available over a wide range. This frequent switching of interfaces causes an increase in unstable factors. Further, when the mobile communication terminal, even stationary, uses a wireless physical interface for a communication, the communication situation changes from time to time in response to a change in radiowave situation, in which case the physical interfaces are frequently switched from one to another, giving rise to a similar problem.

Otherwise, even if a user wants to use a particular communication interface at a particular location for a communication, the conventional automatic selection method selects another interface which presents a better communication situation than the interface intended by the user. Therefore, the user must perform cumbersome manual switching.

It is therefore an object of the present invention to provide a mobile communication terminal device which is capable of automatically selecting a physical interface for a communication suitable for a particular use situation and use location of the mobile communication terminal device based on a moving condition and positional information of the mobile communication terminal device.

Positional information on the mobile communication terminal device is acquired from GPS (Global Positioning System), a portable telephone base station or the like, to determine a moving situation of the mobile communication terminal device, whether it is moving at a certain speed or it remains at rest. A physical interface is selected based on the moving situation of the mobile communication terminal device and the availability for a communication of respective communication interfaces.

When the mobile communication terminal device is moving at a high speed, a physical interface such as the portable telephone which provides a connection over a wider range is selected, and is not switched to another physical interface even if the other physical interface presents a better situation. On the other hand, when the mobile communication terminal unit remains at rest or moving at a low speed, a narrow-range but inexpensive physical interface such as wireless LAN (Local Area Network) or PHS (Personal Handy-Phone System) is selected.

The positional information, as well as a physical interface used at that time and a moving situation at that time may be stored in a database to automatically select the stored physical interface for a connection near the location at the next time, thereby making it possible to avoid a connection to an unintended physical interface and to remove the effort of manual switching.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram illustrating an exemplary configuration of a system according to the present invention;

FIG. 2 is a block diagram illustrating an exemplary configuration of a system in a first embodiment of the present invention;

FIG. 4 is a flow chart illustrating a sequence of operations in the first embodiment of the present invention;

FIG. 10 is a table showing exemplary data stored in a memory in the third embodiment of the present invention; and FIG. 11 is a block diagram illustrating an exemplary configuration of a system in a fourth embodiment of the present invention.

DESCRIPTION OF THE EMBODIMENTS

Figure 3A:
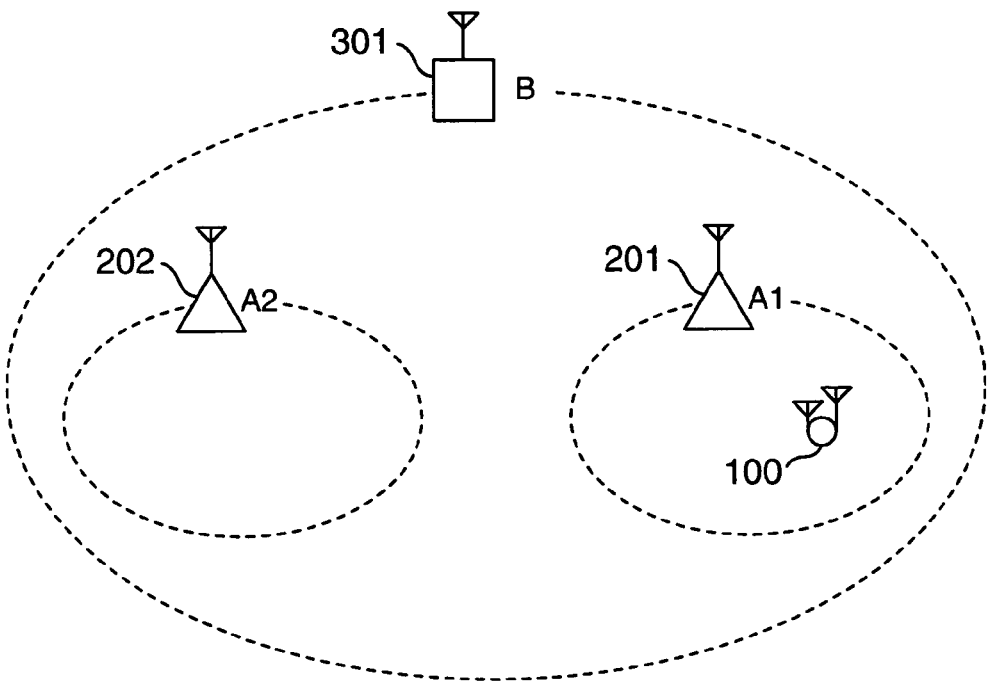
FIGS. 3A and 3B are diagrams for describing an environment in which a mobile communication terminal device is used, and a general operation in the first embodiment of the present invention.

In the following, several embodiments of the present invention will be described with reference to the accompanying drawings. First, the configuration of a mobile communication terminal device according to one embodiment of the present invention will be generally described with reference to FIG. 1 which is a block diagram illustrating the configuration of the mobile communication terminal device according to the embodiment of the present invention.

The mobile communication terminal device 100 may be a portable terminal such as a notebook type personal computer, a portable telephone, a PDA (Personal Digital Assistance), a car navigation device having a communication function, or the like, which is connected to the outside for a communication. Physical interfaces 120, 130, each of which may be, for example, an interface module of a wireless LAN, a wireless interface of PHS, a wireless interface of portable telephone, or the like, are connected to networks 200, 300 of associated communication channels, respectively, for interfacing data communicated between the outside and the mobile communication terminal device 100. An output unit 101, which may be a device for outputting a display or sound such as an LCD, a speaker or the like, displays information or outputs sound for the user. An input unit 102, which may be an information input device such as a keyboard, a microphone or the like, receives information and instructions from the user. A terminal data control processing unit 103, which may be based on a CPU, a microcomputer IC or the like, is responsible for the processing associated with a communication application control and a communication control for processing data inputted from the interfaces 200, 300 of the respective communication channels through the physical interfaces 120, 130 and a physical interface selection unit 104, and for transmitting data from the mobile communication terminal device 100 to the outside. The terminal data control processing unit 103 is also responsible for processing input information from the user, and processing information outputted to the user. The physical interface selection unit 104 selects an interface to be used from the physical interfaces 120, 130 connected to the respective external communication channels in accordance with a signal from a switching determination unit 108 to permit data communications with the terminal data control processing unit 103. A communication condition determination unit 105 monitors communications between the respective physical interfaces 120, 130 and external networks 200, 300 to determine whether or not a communication to the outside is possible, and the stability of the communication. A position detection unit 106, which may be exemplified by the GPS or the like, acquires positional data through a direct communication with satellites, and processes positional data sent thereto from mobile telephone base stations through the physical interfaces 120, 130 to acquire positional information on the mobile communication terminal device 100. A movement determination unit 107 monitors the positional information from the position detection unit 106 to determine a moving situation of the mobile communication terminal device 100. The switching determination unit 108 determines a physical interface to be used from interface switching specifying information from the terminal data control processing unit 103, communication condition information from the communication condition determination unit 105, terminal movement information from the movement determination unit 107, and the like, and sends an instruction signal to the physical interface selection unit 104.

Next, the operation of the mobile communication terminal device 100 in a first embodiment will be described with reference to FIGS. 2 to 6.

FIG. 2 is a block diagram illustrating an exemplary configuration of a system in the first embodiment, where a plurality of different physical interfaces 120, 130 in the first embodiment are specifically assigned to a public wireless LAN interface 120 and a portable telephone interface 130, respectively. In this configuration, the external networks 200, 300 are a network which includes access points of the public wireless LAN, and a network connected through a portable telephone base station, respectively. They are also connected to the Internet. In other words, the mobile communication terminal device 100 has two different interfaces for the wireless LAN and portable telephone, and therefore can be connected to either the wireless LAN or portable telephone.

Figure 3B:
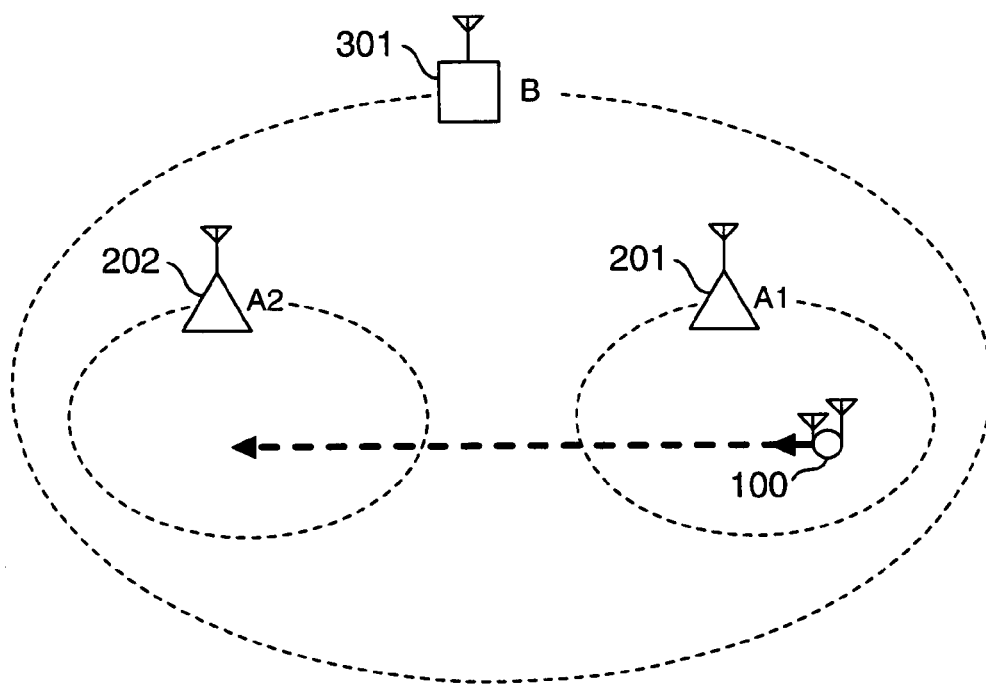

Next, the relationship between an environment in which the terminal device 100 is used and the control operation will be outlined with reference to FIGS. 3A and 3B. FIGS. 3A and 3B are diagrams which represent an environment in which the mobile communication terminal device 100 may be used. Ovals A1, A2 represent ranges in which communications are available through the wireless LAN, and access points 201, 202 are provided in the respective ranges. A larger oval B represents a range in which communications are available through the portable telephone, in which a base station 301 is installed for a connection. Recently, the wireless LAN range, which is also referred to as a hot spot, is characterized by a low communication cost though within a narrow range, whereas the portable telephone is characterized by a wider available range though at a high communication cost.

Assume first that the mobile communication terminal device 100 remains at rest. For example, when the mobile communication terminal device 100 makes a communication while it remains at rest as illustrated in FIG. 3A, the communication is available through either of the wireless LAN and portable telephone. In this event, a communication is preferably made through the access point 201 of the inexpensive wireless LAN. With the switching in a conventional communication situation, when a communication situation with the wireless LAN access point 201 temporarily becomes worse than a communication situation with the portable telephone base station 301, the connection is switched to the portable telephone to cause an instable communication. To solve this problem, in this embodiment, the wireless LAN connection is given a higher priority when the mobile communication terminal device 100 remains at rest, so that the switching determination unit 108 is controlled not to switch the connection even if the communication condition slightly deteriorates to prevent the switching from the physical interface 120 associated with the wireless LAN to the physical interface 130 associated with the portable telephone, thereby improving the stability for the communication.

Next, assume that the mobile communication terminal device 100 is moving. For example, when the mobile communication terminal device 100 makes a communication while it is moving from the area A1 to the area A2, as illustrated in FIG. 3B, the mobile communication terminal device 100 can communicate through either of the wireless LAN and portable telephone while it remains within the area A1. In this event, a communication is preferably made through the portable telephone base station 301 because the mobile communication terminal device 100 can communicate over a wider range. Since the wireless LAN can be utilized only in a narrow range, the moving mobile communication terminal device 100 goes out of its range in a short time, resulting in switching of the connection. With the switching in a conventional communication situation, the wireless LAN is switched to the portable telephone when the mobile communication terminal device 100 goes out of the area A1, and the portable telephone is again switched to the wireless LAN when the mobile communication terminal device 100 enters the area A2. To avoid such frequent switching, in this embodiment, the portable telephone is given a higher priority when the terminal device 100 is moving to provide a communication connection with the portable telephone base station 300 for permitting communications in a wider range. Thus, the switching determination unit 108 is controlled based on the moving speed of the mobile communication terminal device 100 so as not to make the switching to maintain the connection through the portable telephone to permit communications over a wider range, even if the portable telephone presents a worse communication condition than the other scheme.

Now, description will be made on the operation of the respective components in the mobile communication terminal device 100 and a control sequence. When a communication is started by the mobile communication terminal device 100 which has two different interfaces, i.e., the wireless LAN and portable telephone, the user enters a signal indicative of the start of a communication from the input unit 102 in FIG. 2 to the terminal data control processing unit 103, such as a communication start instruction for activating a communication software application such as a browser. The terminal data control processing unit 103 prepares for a data communication through the physical interface selection unit 104, and sends a signal indicative of a specified connection and/or a specified communication software application made by the user, if any, to the switching determination unit 108. The communication condition determination unit 105 in turn monitors communication situations with the external networks 200, 300 through the physical interfaces 102, 103, respectively, to notify the switching determination unit 108 of the availability and favorableness of communications with the respective networks 200, 300. The value indicative of the stability such as the communication favorableness may be an error rate during a data communication, the intensity of radiowave in a wireless communication, or the like. Also, the position detection unit 106 transmits positional information indicative of the position of the terminal, which has been acquired from GPS satellites, an external base station or the like through the terminal data control processing unit 103, to the movement determination unit 107 at all times or when the terminal data control processing unit 103 begins the preparation for a data communication. The movement determination unit 107 determines the moving situation of the mobile communication terminal device 100 from the positional information, and transmits a signal to the switching determination unit 108. In regard to the moving situation, the movement determination unit 107 monitors the positional information to determine that the terminal remains at rest when no change is found in the positional information and to determine that the terminal is moving when there is a change in the positional information. Alternatively, the movement determination unit 107 may compare the positional information at a certain time with the positional information after a fixed time to calculate a value indicative of the moving speed, and may determine that the terminal remains at rest when no change is found in the position; that the terminal is moving at a low moving speed when a small change in position is found; and that the terminal is moving at a high moving speed when a large change in position is found.

The switching determination unit 108 automatically switches from one physical interface to the other based on the information and signal thus acquired, as illustrated in FIG. 4(a). Specifically, at the outset of a communication (S401), the switching determination unit 108 collects the foregoing information to first determine whether or not the user or application specifies a particular connection interface (S402). If specified, the switching determination unit 108 selects the specified connection interface (S403), and switches to the selected interface for starting a communication (S410). When the user, though moving at a high speed, wants to use the wireless LAN, for example, a wireless LAN within a train, instead of a connection communication selected by the automatic selection function, the user is allowed to specify a particular connection interface. When no physical interface is specified for the connection, the switching determination unit 108 determines whether or not there are available interfaces based on an available interface extraction signal (S404) from the communication condition determination unit 105 (S405). If there is no interface available, the switching determination unit 108 tries to extract an available interface (S404) several times. Eventually, if no available interface is extracted even after several trials, the switching determination unit 108 gives up the connection. An available interface extracted at S404 may be regarded as available because the communication condition determination unit 105 monitors the communication situation at all times to know that the communication situation is expected to be ameliorated for a particular interface which cannot be used upon start of a communication. If there available interfaces, the switching determination unit 108 checks based on the signal from the movement determination unit 107 whether or not the mobile communication terminal device 100 is now moving or remains at rest (S407). When the mobile communication terminal device 100 remains at rest, the switching determination unit 108 selects a physical interface from available interfaces based on rest-state priorities shown in FIG. 4(b) (S408). The rest-state priorities may be previously defined or set by the user. In this example, the wireless LAN is used if the mobile communication terminal device 100 remains at rest and can use the wireless LAN, without the need for making a communication through the portable telephone which entails a higher communication charge, so that the wireless LAN is given a higher priority. Then, the switching determination unit 108 switches to the selected interface for making a communication (S410).

Also, the switching determination unit 108 checks based on the signal from the movement determination unit 107 whether or not the mobile communication terminal device 100 is now moving or remains at rest (S407). When the mobile communication terminal device 100 is moving, the switching determination unit 108 selects a physical interface from available interfaces based on moving-state priorities shown in FIG. 4(b) (S409). The moving-state priorities may be previously defined or set by the user. In this example, the mobile communication terminal device 100 on the move uses the portable telephone if it is available, without the need for making a communication through the wireless LAN which can be disconnected during the movement, so that the connection through the portable telephone is given the higher priority. Then, the switching determination unit 108 switches to the selected interface for making a communication (S410).

If a physical interface in use becomes unavailable during a communication, the mobile communication terminal device 100 waits for a fixed time for the physical interface to recover. If the physical interface does not recover even after the fixed time, the connection is switched. Since the mobile communication terminal device 100 is relatively stable in communication when it remains at rest, a physical interface switching wait time may be set to be short. On the other hand, when the mobile communication device 100 is relatively instable in communication when it is moving, the physical interface switching wait time may be set to be long. In this way, it is possible to prevent useless switching from one physical interface to another and to switch to an appropriate physical interface.

Figure 5:
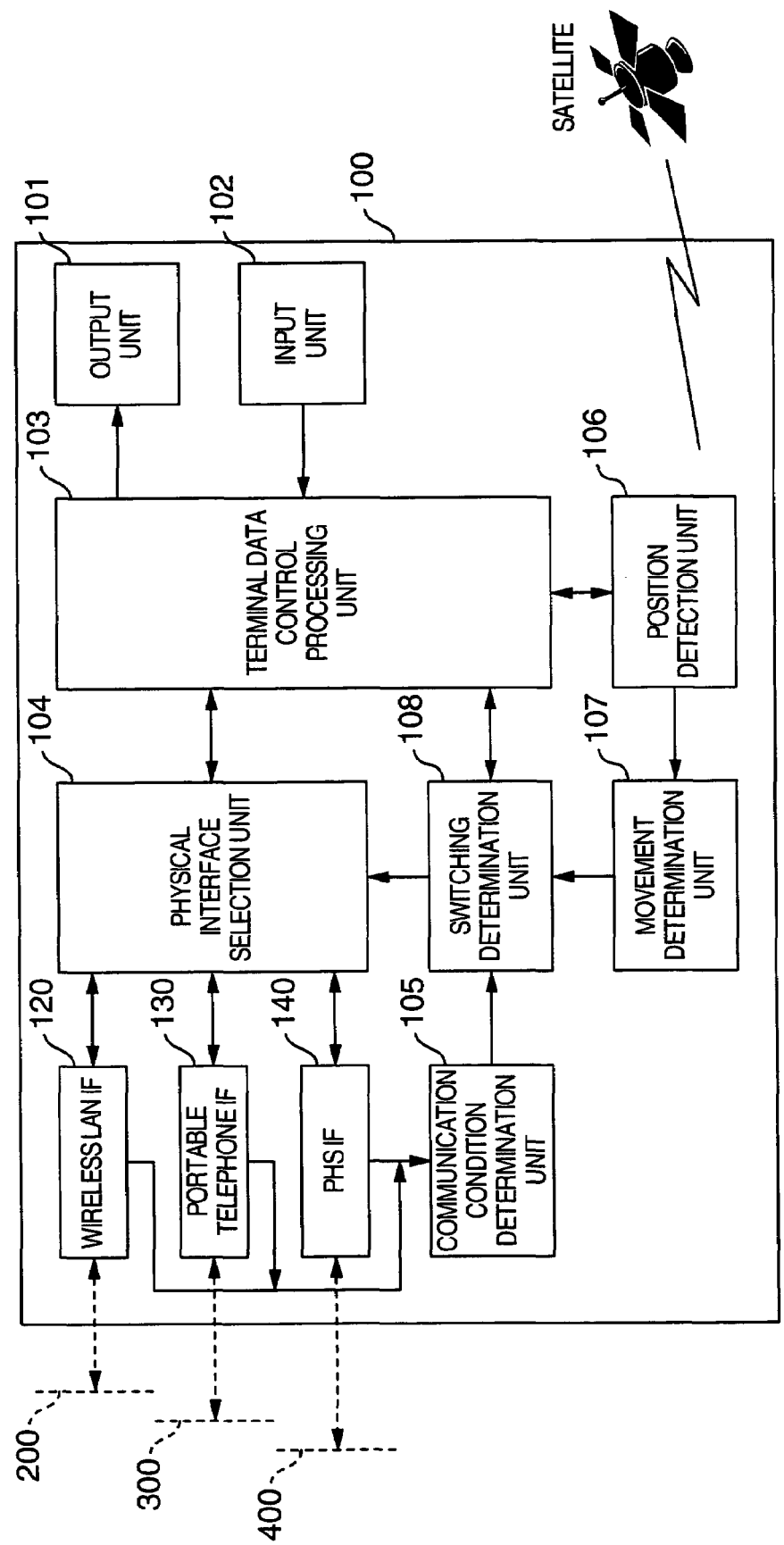
FIG. 5 is a block diagram illustrating a second exemplary configuration of the system in the first embodiment of the present invention.
Figure 6:
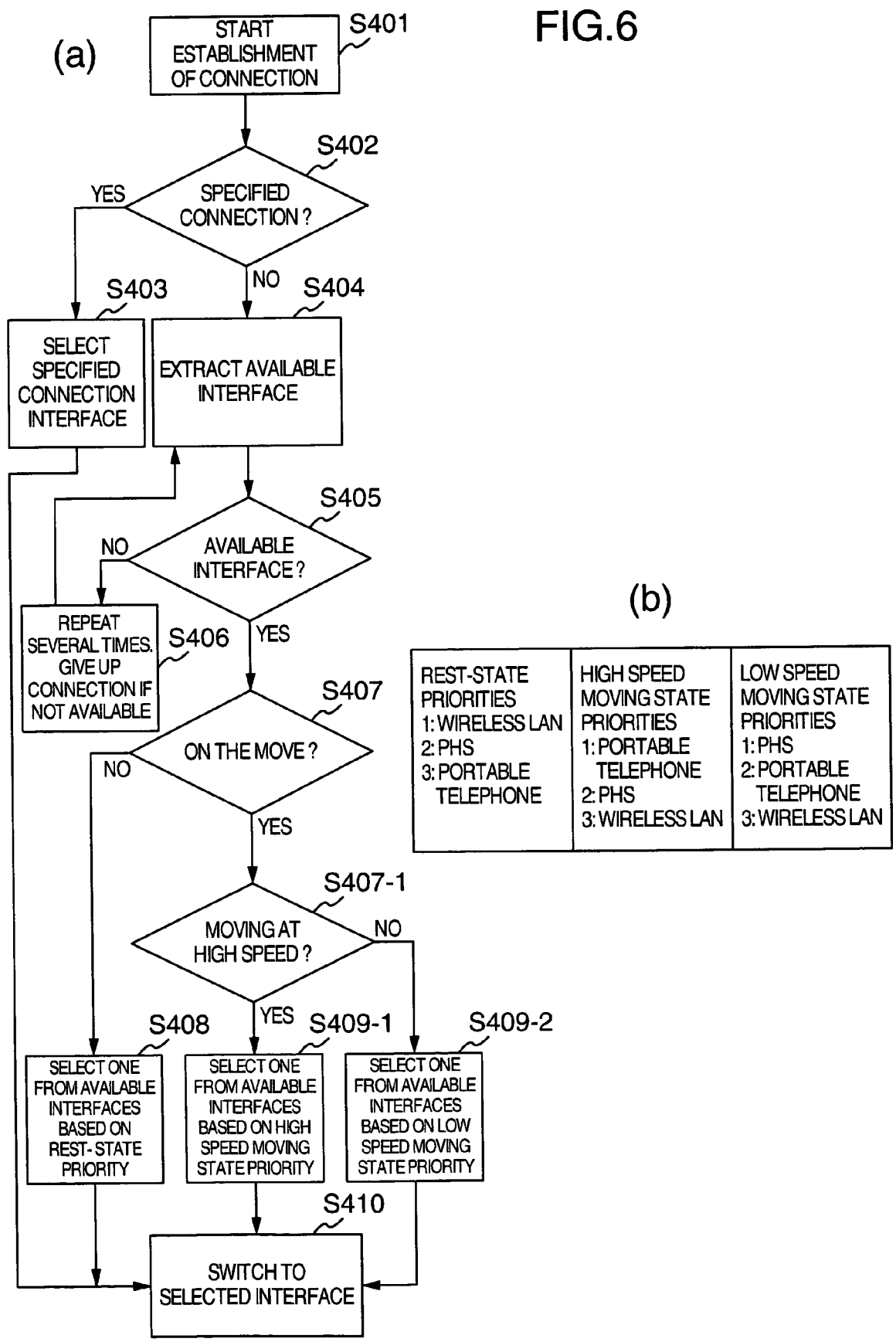
FIG. 6 is a flow chart illustrating a second sequence of operations in the first embodiment of the present invention.

When there are more than two available physical interfaces, the following control can be conducted. FIGS. 5 and 6 illustrates the configuration and control sequence when the mobile communication terminal device 100 can be physically connected to PHS (Personal Handy-Phone System) in addition to the foregoing wireless LAN and portable telephone. The communication through PHS is characterized by a wider communication range but a higher communication charge as compared with the wireless LAN and by a narrow communication range but an inexpensive communication charge as compared with the portable telephone. The PHS is not suitable for communications when the mobile communication terminal device 100 is moving at a high speed because one base station is switched to another a large number of times over a long distance travel. In other words, the PHS is an effective option when the mobile communication terminal device 100 is moving but not at a high speed and not over a long distance. The basic operation of the mobile communication terminal device 100 in FIG. 6(*a*) is similar to that illustrated in FIG. 4(*a*), and is identical up to S407 in FIG. 6 where it is determined whether or not the mobile communication terminal device 100 is moving. When the mobile communication terminal device 100 remains at rest, the switching determination unit 108 selects a physical interface from available interfaces based on rest-state priorities shown in FIG. 6(*b*) (S408), and switches to the selected interface for making a communication (S410). In this example, assuming that communications through the respective interfaces are stable while the mobile communication terminal device 100 remains at rest, the highest priority is given to the reasonableness of communication charge, resulting in the rest-state priorities as shown in FIG. 6(*b*). By thus giving the priorities, one physical interface can be automatically selected from a plurality of or three or more physical interfaces. As described above, the priorities may be previously defined or set by the user. When the mobile communication terminal device 100 is moving, the switching determination unit 108 further determines from the positional information and movement information whether or not the terminal device 100 is moving at a high speed or at a low speed (S407-1). When the mobile communication terminal device 100 is moving at a high speed, the switching determination unit 108 selects a physical interface from available interfaces based on high speed moving state priorities shown in FIG. 6(*b*) (S409-1), and switches to the selected interface for making a communication (S410). On the other hand, when the mobile communication terminal device 100 is moving at a low speed, the switching determination unit 108 selects a physical interface from available interfaces based on low speed moving state priorities shown in FIG. 6(*b*) (S409-2), and switches to the selected interface for making a communication (S410). In this way, by setting the priorities for the physical interfaces based on the moving situation of the mobile communication terminal device 100 such as the moving speed, a physical interface suitable for a particular moving situation and use situation can be automatically selected from a plurality of physical interfaces.

While the foregoing embodiment employs only wireless interfaces, the physical interfaces are not limited to wireless interfaces but may include wired interfaces. In addition, a physical interface can be switched to another one in the middle of a communication or in the middle of the operation of a communication application by transmitting a signal from the terminal data control processing unit 103 to the switching determination unit 108 and the like at a switchable timing.

Figure 7:
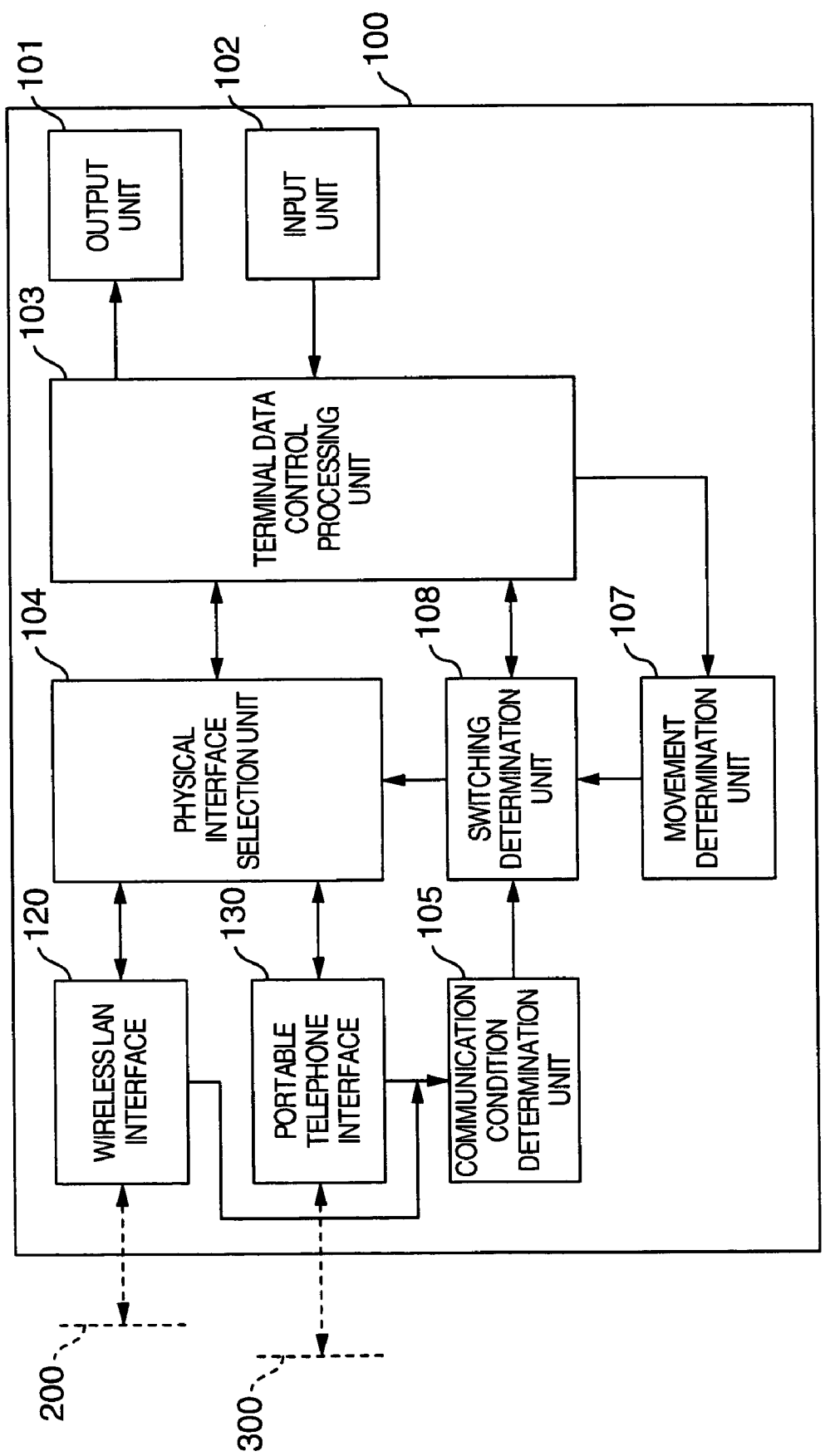
FIG. 7 is a block diagram illustrating an exemplary configuration of a system in a second embodiment of the present invention.

Next, the operation of the mobile communication terminal device 100 in a second embodiment will be described with reference to FIG. 7. While the second embodiment is substantially similar in configuration to the first embodiment, the former excludes the position detection unit and maintains the movement determination unit 107. The movement determination unit 107 employs a device for measuring vibrations or acceleration of the mobile communication terminal device 100 to determine whether the mobile communication terminal device 100 remains at rest or is moving, without using positional information. The movement determination unit 107 may receive movement information from a vibration sensor, an acceleration sensor, a base station or the like, and can be implemented in a simple configuration. As compared with the first embodiment, the second embodiment differs in the configuration of the part for determining whether the mobile communication terminal device 100 remains at rest or is moving, and is similar to the first embodiment in the control operation and sequence.

Figure 8:
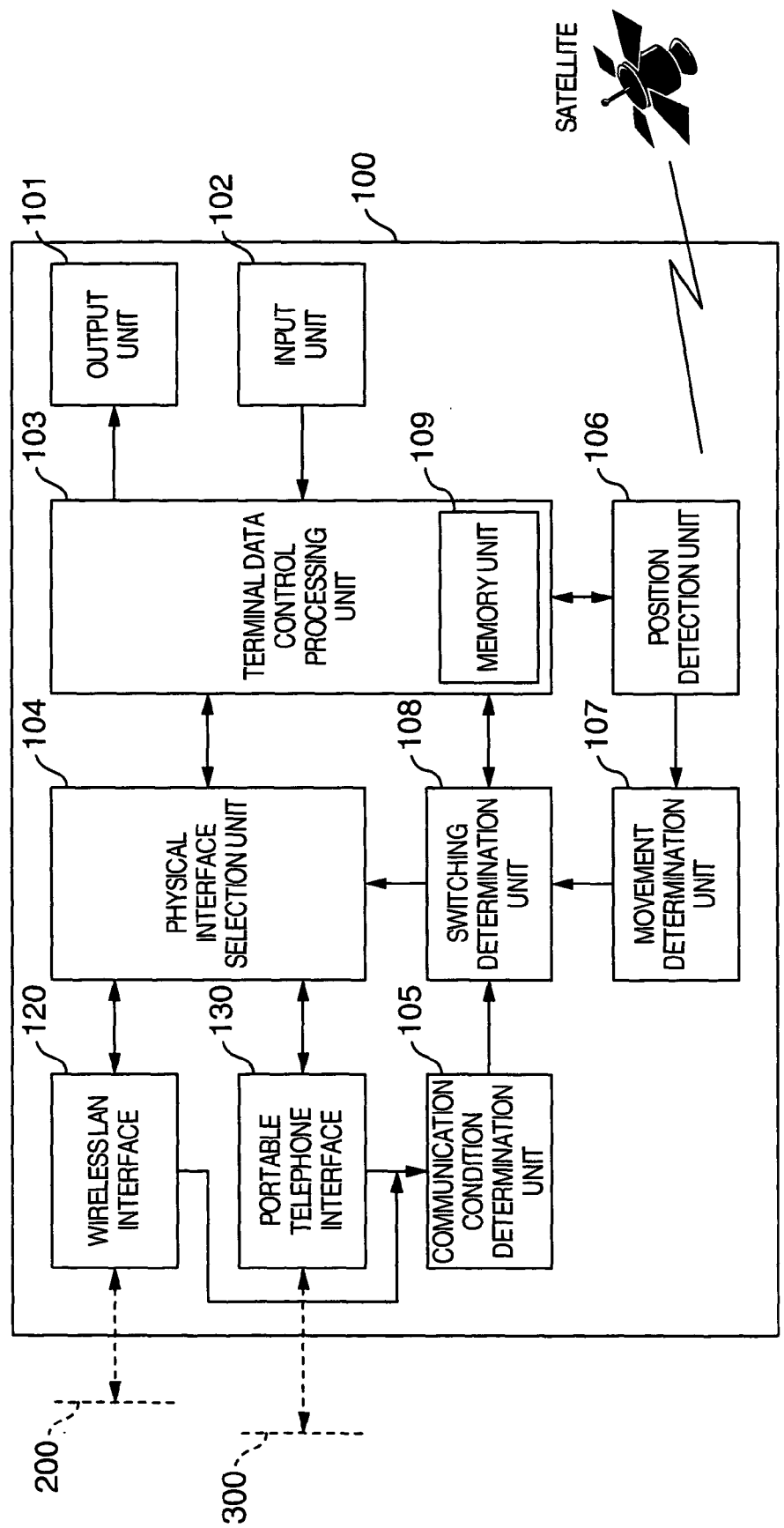
FIG. 8 is a block diagram illustrating an exemplary configuration of a system in a third embodiment of the present invention.

Next, the operation of the mobile communication terminal device 100 in a third embodiment will be described with reference to FIGS. 8 to 10. FIG. 8 is a block diagram illustrating the configuration of the third embodiment. Though similar in configuration to the first embodiment, the mobile communication terminal device 100 according to the third embodiment additionally comprises a memory unit 109 for storing positional information during a communication, a moving situation, and a physical interface used for the communication. The memory unit 109 may be a memory IC, a hard disk drive, or the like. The operation of the third embodiment generally involves comparing positional information and moving situation of the mobile communication terminal device 100 during a communication with data stored in the memory unit 109 to select a physical interface for use in the communication based on the past communication settings at a particular location and communication situation, and communication available information from the outside.

Describing the operation, the user enters a signal indicative of the start of a communication from the input unit 102 in FIG. 8 to the terminal data control processing unit 103, such as a communication start instruction for activating a communication software application such as a browser. The terminal data control processing unit 103 prepares for a data communication through the physical interface selection unit, and sends a signal indicative of a specified connection and/or a specified communication software application made by the user, if any, to the switching determination unit 108. In addition, the terminal data control processing unit 103 also transmits information such as positional information, moving situation, physical interface used in that event, and the like as shown in FIG. 10, stored in the memory unit 109 to the switching determination unit 108. The information stored in the memory unit 109 may be positional information, moving situations and physical interfaces associated with communications made in the past, or may be positional information, moving situation and physical interface acquired from the outside. The past information can be set to be communicated using the same physical interface as the past. The externally acquired information can be utilized to know at which location an intended external interface can be used in which situation, thereby facilitating the setting of a physical interface. For example, when the user is to make a communication from the mobile communication terminal device 100 in a train which provides a wireless LAN, the user can continuously utilize the wireless LAN, which must be narrow in communication available range, for a connection though the user is moving at a high speed. When information indicating each location on a railway and the availability even at a high speed is stored in the memory unit 109 of the mobile communication terminal device 100 from a wireless LAN network in an external train, determination can be made that the wireless LAN can be used even if the mobile communication terminal device 100 is moving at a high speed at that location, thereby facilitating the automatic setting of the physical interface.

Otherwise, the communication condition determination unit 105, position detection unit 106 and movement determination unit 107 perform similar operations to those in the first embodiment, and transmit signals to the switching determination unit 108. The switching determination unit 108 performs the automatic physical interface switching as illustrated in FIG. 9(a) based on the information and signals thus applied thereto.

Figure 9:
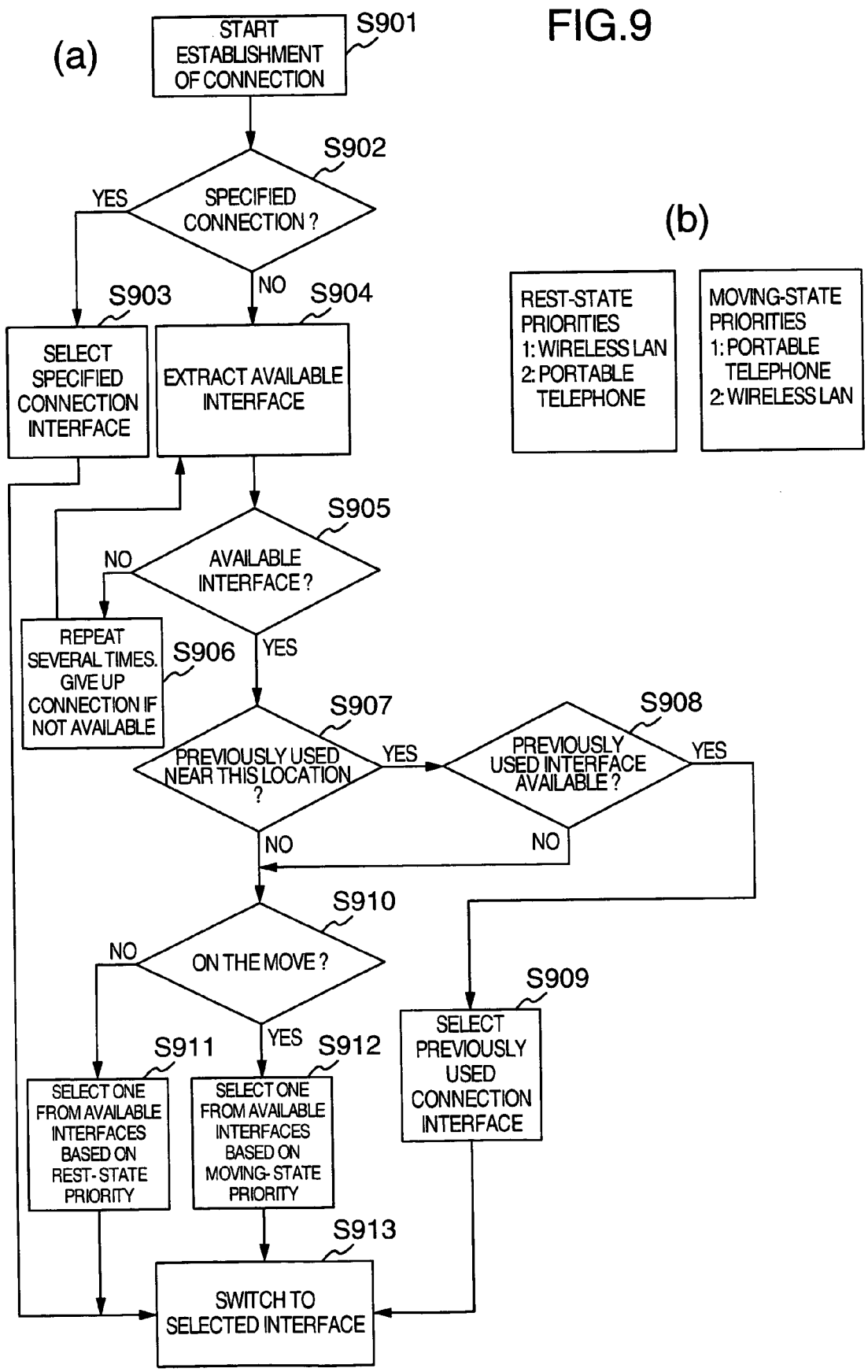
FIG. 9 is a flow chart illustrating a sequence of operations in the third embodiment of the present invention.

Referring next to FIG. 9, description will be made on a control sequence for the respective components. At the outset of a communication (S901), the switching determination unit 108 collects the foregoing information to first determine whether or not the user or application specifies a particular connection interface (S902). If specified, the switching determination unit 108 selects the specified connection interface (S903), and switches to the selected interface (S913) for starting a communication. When no physical interface is specified for a connection, the switching determination unit 108 determines whether or not there is an available interface based on an available interface extraction signal (S904) from the communication condition determination unit 105 (S905). If there is no interface available, the switching determination unit 108 tries to extract an available interface (S904) several times. Eventually, if no available interface is found even after several trials, the switching determination unit 108 gives up the connection (S906). If there is an available interface, the switching determination unit 108 checks based on the positional information and movement information from the movement determination unit 107 as well as information stored in the memory unit 109 whether or not the interface has been previously used near this location (S907). When the interface has been previously used, this physical interface is selected (S909) if it is available (S908). The switching determination unit 108 switches to this selected physical interface for making a communication (S913). By providing the ability to automatically select a previously used interface depending on the location, even a physical interface which must be manually set for the first time can be automatically set from the second time only by bringing the mobile communication terminal device 100 to that location. When the memory unit 109 does not store a past record indicating that a particular interface has been used at that location, or when a previously used interface is not available, the switching determination unit 108 determines whether or not the mobile communication terminal device 100 is moving (S910), followed by the processing similar to that in the first embodiment. When the mobile communication terminal device 100 remains at rest, the switching determination unit 108 selects a physical interface from available interfaces based on rest-state priorities shown in FIG. 9(b) (S911), and switches to the selected interface for making a communication (S913). When the mobile communication terminal device 100 is moving, the switching determination unit 108 selects a physical interface from available interfaces based on moving-state priorities shown in FIG. 9(b) (S912), and switches to the selected interface for making a communication (S913).

In the exemplary sequence illustrated in FIG. 9, the information stored in the memory unit 109 is past communication information, but may be positional information, moving situation and physical interface acquired from the outside, as described above.

While the memory unit 109 in FIGS. 8 and 11 is included in the terminal data control processing unit 103, the mobile communication terminal device 100 of the present invention is not limited to this configuration, but the memory unit 109 may be connected external to the terminal data control processing unit 103.

FIG. 11 illustrates the configuration of the mobile communication terminal device according to a fourth embodiment which removes the movement determination unit 107 from the third embodiment, where the positional information detected by the position detection unit 106 can be relied on to perform the automatic switching among physical interfaces, in which case the item "moving situation" is not need in FIG. 10, and the sequence in FIG. 9 only involves the automatic selection of a physical interface which has been previously used at a particular location.

Otherwise, the output unit 101 may be visually or audibly output what a selected physical interface is, thereby letting the user know at a glance a physical interface which is automatically selected from a plurality of physical interfaces. Thus, the user can monitor a continued communication through an unintended connection as well as unintended automatic switching. Not only the selected physical interface, communication states for all physical interfaces may be acquired from the communication condition determination unit 105 for display.

In the foregoing manner, in the mobile communication terminal device which comprises a plurality of different communication interfaces and automatically switches among these interfaces for making a communication, it is possible to provide a stable communication irrespective of whether the mobile communication terminal device remains at rest or is moving and to automatically select, to some extent, a communication interface intended by the user.

Also, in the mobile communication terminal device which can be connected to any of a plurality of different communication interfaces, a stable communication can be provided by determining a moving situation from the positional information on the mobile communication terminal device, and selectively switching to a physical interface suitable for a particular communication depending on the moving situation. Also, a physical interface can be automatically selected for a connection depending on the location at which the mobile communication terminal device is to be used, based on the positional information on the mobile communication terminal device, so that the mobile communication terminal device can be automatically connected to a physical interface intended by the user for a communication.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A mobile communication terminal device having a first physical interface for making a communication to the outside, a second physical interface different in scheme from said first physical interface, and a selection switching determination unit for selecting one from said first and second physical interfaces to switch to a selected physical interface, said mobile communication terminal device comprising:
   a communication determination unit for determining whether or not each of said first and second physical interfaces is available for a communication;
   a movement determination unit for determining a moving speed of said mobile communication terminal device; and
   a position detection unit for detecting a position of said mobile communication terminal device,
   wherein said selection switching determination unit makes a selection switching based on the communication availability determined by said communication determination unit, the moving speed determined by said movement determination unit, and the position detected by said position detection unit, and
   wherein said selection switching determination unit waits a longer time until switching of said physical interface when said movement determination unit determines the moving speed being faster.

2. A mobile communication terminal device according to claim 1, wherein said position detection unit acquires information on the position from outside.

3. A mobile communication terminal device according to claim 2, further comprising:
   an output unit for notifying a user of said first or second physical interface which is in use.

4. A mobile communication terminal device according to claim 2, further comprising:
   an output unit for notifying a user of the communication availability determined by said communication determination unit.

5. A mobile communication terminal device according to claim 1, further comprising:
   a memory for storing the position detected by said position detection unit, and a physical interface used at said position,
   wherein said selection switching determination unit makes the selection and switching based on the communication availability determined by said communication determination unit, the position detected by said position detection unit, and the position and the used physical interface stored in said memory.

6. A mobile communication terminal device according to claim 1, wherein said position detection unit acquires information on the position from outside.

7. A mobile communication terminal device having a first physical interface for making a communication to the outside, a second physical interface different in scheme from said first physical interface, and a selection switching determination unit for selecting one from said first and second physical interfaces to switch to a selected physical interface, said mobile communication terminal device comprising:
   a communication determination unit for determining whether or not each of said first and second physical interfaces is available for a communication;
   a movement determination unit for determining a moving speed of said mobile communication terminal device; and
   a position detection unit for detecting a position of said mobile communication terminal device,
   wherein said selection switching determination unit makes a selection switching based on the communication availability determined by said communication determination unit, the moving speed determined by said movement determination unit, and the position detected by said position detection unit, and
   wherein said selection switching determination unit selects one of a plurality of priorities for said first or second physical interface in accordance with the moving speed determined by said movement determination unit.

8. A mobile communication terminal device according to claim 7, further comprising:
   an output unit for notifying a user of said first or second physical interface which is in use.

9. A mobile communication terminal device having a first physical interface for making a communication to the outside, a second physical interface different in scheme from said first physical interface, and a selection switching determination unit for selecting one from said first and second physical interfaces to switch to a selected physical interface, said mobile communication terminal device comprising:
   a communication determination unit for determining whether or not each of said first and second physical interfaces is available for a communication;
   a movement determination unit for determining a moving speed of said mobile communication terminal device;
   a position detection unit for detecting a position of said mobile communication terminal device,
   wherein said selection switching determination unit makes a selection switching based on the communication availability determined by said communication determination unit, the moving speed determined by said movement determination unit, and the position detected by said position detection unit; and
   a priority setting unit for setting a priority of said selection switching determination of said first or second physical interface in said selection switching determination unit.

10. A mobile communication terminal device according to claim 9, further comprising:
    an output unit for notifying a user of the communication availability determined by said communication determination unit.

* * * * *